DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 2, 1970

875 O.G. 12

T875,004
REGENERATION OF CHROMATOGRAPHY SUPPORT

Donald E. Linder, 1708 NE. Woodlands, Ponca City, Okla. 74601

Filed Sept. 22, 1969, Ser. No. 860,075
Int. Cl. F26b *3/06*
U.S. Cl. 34—30
No Drawing. 4 Pages Specification

Solid particulate support material, which is coated with a waxy or liquid substrate for use in separating mixtures by gas-liquid chromatography, is regenerated for re-use by thermal treatment.